(12) United States Patent
Song et al.

(10) Patent No.: US 9,081,384 B2
(45) Date of Patent: Jul. 14, 2015

(54) AUTONOMOUS ELECTRONIC APPARATUS AND NAVIGATION METHOD THEREOF

(71) Applicant: National Chiao Tung University, Hsinchu (TW)

(72) Inventors: Kai-Tai Song, Hsinchu (TW); Shang-Chun Hung, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 181 days.

(21) Appl. No.: 13/854,131

(22) Filed: Mar. 31, 2013

(65) Prior Publication Data

US 2014/0156125 A1    Jun. 5, 2014

(30) Foreign Application Priority Data

Dec. 5, 2012  (TW) .............................. 101145700 A

(51) Int. Cl.
```
G05D 1/02      (2006.01)
B60W 20/00     (2006.01)
```
(52) U.S. Cl.
CPC .............. *G05D 1/0223* (2013.01); *G05D 1/028* (2013.01); *G05D 1/0248* (2013.01); *B60W 20/00* (2013.01); *G05D 1/0272* (2013.01); *Y10S 901/01* (2013.01); *Y10S 901/47* (2013.01)

(58) Field of Classification Search
None
See application file for complete search history.

(56) References Cited

U.S. PATENT DOCUMENTS

| | | | | |
|---|---|---|---|---|
| 5,321,614 | A | * | 6/1994 | Ashworth ........................ 701/26 |
| 5,758,298 | A | * | 5/1998 | Guldner ........................... 701/23 |
| 6,289,270 | B1 | * | 9/2001 | Baumgarten ..................... 701/26 |
| 6,463,368 | B1 | * | 10/2002 | Feiten et al. ..................... 701/23 |
| 8,712,588 | B2 | * | 4/2014 | Myeong et al. ................ 700/258 |
| 2006/0025887 | A1 | | 2/2006 | Park |
| 2007/0061041 | A1 | | 3/2007 | Zweig |
| 2007/0188883 | A1 | * | 8/2007 | Seo et al. ....................... 359/676 |
| 2007/0192910 | A1 | * | 8/2007 | Vu et al. .......................... 901/17 |

(Continued)

FOREIGN PATENT DOCUMENTS

| | | |
|---|---|---|
| TW | I318691 | 12/2009 |
| TW | I324101 | 5/2010 |

(Continued)

OTHER PUBLICATIONS

Park et al., "Sound Source Localization Based on Audio-visual Information for Intelligent Service Robots," Int. Symposium on Advanced Intelligent Systems, Sep. 2007, pp. 364-367.

(Continued)

*Primary Examiner* — Mussa A Shaawat
(74) *Attorney, Agent, or Firm* — Jianq Chyun IP Office

(57) ABSTRACT

An autonomous electronic apparatus and a navigation method thereof are provided. The navigation method includes the following steps. Firstly, a calling signal from a target is received through a wireless sensor network. A position relationship between the target and the autonomous electronic apparatus is analyzed to generate a first speed. Next, an image set is captured and an image relationship between the image set and the target is analyzed to generate a second speed. Afterwards, a weighting value related to the position relationship is calculated. Besides, a moving speed is calculated according to the weighting value, the first speed and the second speed, and a moving status of the autonomous electronic apparatus moving toward the target is controlled via the moving speed.

18 Claims, 3 Drawing Sheets

(56) References Cited

U.S. PATENT DOCUMENTS

2010/0225541 A1 9/2010 Hertzog et al.
2013/0218395 A1* 8/2013 Kim et al. .................. 701/23

FOREIGN PATENT DOCUMENTS

TW 201203874 1/2012
TW 201224955 6/2012

OTHER PUBLICATIONS

Song et al., "Wireless Sensor and Actuator Network System for Calling Home Robots," Proc. of the 2010 IEEE International Conference on Information and Automation, Jun. 20-23, 2010, pp. 1553-1558.
Jiang et al., "A Call-to-Service Design for Mobile Robots Using Zigbee Sensor Networks," 2011 8th Asian Control Conference (ASCC), May 15-18, 2011, pp. 317-322.
Shang-Chun Hung, "A Call-to-Service Design for Mobile Robots Using Wireless Sensor Network," Master's Thesis, National Chiao Tung University, Institute of Electrical Control Engineering, College of Electrical and Computer Engineering, May 2012, pp. 1-87 with an English Abstract thereof on p. 4.
S. Ahrens, "Vision-Based Guidance and Control of a Hovering Vehicle in Unknown Environments," Master's thesis, Massachusetts Institute of Technology, May 2008, pp. 1-13.
Bachrach et al., "RANGE—Robust Autonomous Navigation in GPS-denied Environments," 2010 IEEE International Conference on Robotics and Automation, May 3-8, 2010, pp. 1096-1097.
"Office Action of Taiwan Counterpart Application", issued on Nov. 24, 2014, p. 1-p. 6.

* cited by examiner

AUTONOMOUS ELECTRONIC APPARATUS AND NAVIGATION METHOD THEREOF

CROSS-REFERENCE TO RELATED APPLICATION

This application claims the priority benefit of Taiwan application serial no. 101145700, filed on Dec. 5, 2012. The entirety of the above-mentioned patent application is hereby incorporated by reference herein and made a part of this specification.

BACKGROUND

1. Field of the Invention

The present invention is directed to an autonomous electronic apparatus and a navigation method thereof. More particularly, the present invention is directed to an autonomous electronic apparatus combined with a wireless sensor network and image tracking and a navigation method thereof.

2. Description of Related Art

Along with the thriving development of science and technology, researches related to all kinds of intelligent robots have been rapidly developed. In the field in regard to the research of robots, not only enabling a robot to perform various kinds of anthropomorphic behaviors but also enabling the robot to move toward a positioned location in front of a user in response to the user's calling to and a navigation mechanism thereof have become one of the most popular research topics.

In the related art, the positioning and navigation mechanisms of the robot are commonly implemented via a manner of an infrared ray, wireless sensor network or voice recognition. However, a positioning or a navigation result of the aforementioned manners usually turns out to be inaccurate due the unstable factors of the environment, such that the robot can not be accurately navigated to the front of the caller.

SUMMARY

Accordingly, the present invention is directed to an autonomous electronic apparatus and a navigation method thereof, which are capable of accurately positioning by combining a positioning method of a wireless sensor network and an image tracking method, such that a robot is navigated to the front of a caller.

The present invention is directed to a navigation method adapted for an autonomous electronic apparatus. The method includes steps as follows. First, a calling signal is received through a wireless sensor network, wherein the calling signal is from a target. Then, a position relationship between the target and the autonomous electronic apparatus is analyzed to generate a first speed. Next, an image set is captured, and an image relationship between the image set and the target is analyzed to generate a second speed. Afterward, a weighting value related to the position relationship is calculated, and a moving speed is calculated according to the weighting value, the first speed and the second speed.

In an embodiment of the present invention, the step of analyzing the position relationship between the target and the autonomous electronic apparatus to generate the first speed includes steps as follows. An estimated position of the autonomous electronic apparatus is estimated. Then, a target position of the target is received through the wireless sensor network. Thereafter, the first speed of enabling the autonomous electronic apparatus to move toward the target is determined according to the estimated position and the target position.

In an embodiment of the present invention, the step of estimating the estimated position of the autonomous electronic apparatus includes steps as follows. A first positioning location of the autonomous electronic apparatus is estimated, and reliability of the first positioning location is determined. Then, an accumulated movement distance of the autonomous electronic apparatus is calculated, and a second positioning location of the autonomous electronic apparatus is estimated according to the accumulated movement distance. Thereafter, a positioning weighting value of the first positioning location is determined according to the reliability and the accumulated movement distance, and the estimated position of the autonomous electronic apparatus is calculated according to the positioning weighting value, the first positioning location and the second positioning location.

In an embodiment of the present invention, the step of estimating the first positioning location of the autonomous electronic apparatus includes receiving position information associated with a plurality of sensor nodes in the wireless sensor network, detecting a signal strength of each of the sensor nodes and then, determining the first positioning location according to a corresponding relationship between the position information and the signal strength of each of the sensor nodes.

In an embodiment of the present invention, the step of determining the reliability of the first positioning location includes recording the first positioning location and calculating difference value between the first positioning location in a current time interval and the first positioning location in a previous time interval, wherein the difference value and the reliability is inversely proportional.

In an embodiment of the present invention, the step of analyzing the position relationship between the target and the autonomous electronic apparatus to generate the first speed further comprising scanning obstacles around the autonomous electronic apparatus, such that the autonomous electronic apparatus can dodge the obstacles while moving to the target by adjusting the first speed.

In an embodiment of the present invention, the image set includes a depth image and a color image, the target is a human body, and the step of analyzing the image relationship between the image set and the target to generate the second speed includes detecting a humanoid coordinate of the human body is detected in the depth image, then, detecting face information of the human body in the color image and determining the second speed of enabling the autonomous electronic apparatus to move toward the human body by combining the humanoid coordinate and the face information.

In an embodiment of the present invention, the step of detecting the humanoid coordinate of the human body in the depth image includes finding out a body shape of the human body is found out according to a body recognition database, displaying the body shape in the depth image and performing a centroid calculation on the displayed body shape to determine the humanoid coordinate.

In an embodiment of the present invention, the face information comprises a center coordinate and a face width, and the step of detecting the face information of the human body in the color image includes finding out a face region of the human body according to a face recognition database and then, calculating the center coordinate and the face width of the face region.

According to another embodiment of the present invention, the present invention is directed to an autonomous electronic apparatus including a communication unit, a navigation module, an image tracking module and a processing unit. The communication unit receives a calling signal through a wireless sensor network, wherein the calling signal is form a target. The navigation module is coupled to the communication unit and analyzes a position relationship between the target and the autonomous electronic apparatus to generate a first speed. The image tracking module includes an image capturing unit and an analyzing unit. The image capturing unit captures an image set. The analyzing unit is coupled to the image capturing unit and analyzes an image relationship between the image set and the target to generate a second speed. The processing unit is coupled to the navigation module and the analyzing unit, calculates a weighting value related to the position relationship, calculates a moving speed according to the weighting value, the first speed and the second speed and controls a moving status of the autonomous electronic apparatus to move toward the target via the moving speed.

In an embodiment of the present invention, the navigation module estimates an estimated position of the autonomous electronic apparatus receives a target position of the target through the wireless sensor network and determines the first speed of enabling the autonomous electronic apparatus to move toward the target according to the estimated position and the target position.

In an embodiment of the present invention, the navigation module includes a positioning unit, an odometer and a calculation unit. The positioning unit estimates a first positioning location of the autonomous electronic apparatus and determines reliability of the first positioning location. The odometer calculates an accumulated movement distance of the autonomous electronic apparatus and estimates a second positioning location of the autonomous electronic apparatus according to the accumulated movement distance. The calculation unit is coupled to the positioning unit and the odometer, determines a positioning weighting value of the first positioning location according to the reliability and the accumulated movement distance and calculates the estimated position of the autonomous electronic apparatus according to the positioning weighting value, the first positioning location and the second positioning location.

In an embodiment of the present invention, the communication unit receives position information associated with a plurality of sensing points in the wireless sensor network and detects a signal strength of each of the sensing points. The positioning unit determines the first positioning location according to a corresponding relationship between the position information and the signal strength of each of the sensing points.

In an embodiment of the present invention, the analyzing unit records the first positioning location and calculates a difference value between the first positioning location in a current time interval and the first positioning location in a previous time interval, wherein the difference value and the reliability is inversely proportional.

In an embodiment of the present invention, the navigation module further includes a scanning unit, coupled to the calculation unit, scanning obstacles around the autonomous electronic apparatus, such that the calculation unit can make the autonomous electronic apparatus dodge the obstacles while moving to the target by adjusting the first speed.

In an embodiment of the present invention, the image set includes a depth image and a color image. The target is a human body. The analyzing unit detects a humanoid coordinate of the human body in the depth image, detects face information of the human body in the color image and then, determines the second speed of enabling the autonomous electronic apparatus to move toward the human body by combining the humanoid coordinate and the face information.

In an embodiment of the present invention, the analyzing unit finds out a body shape of the human body according to a body recognition database, displays the body shape in the depth image and performs a centroid calculation on the displayed body shape to determine the humanoid coordinate.

In an embodiment of the present invention, the face information includes a center coordinate and a face width, and the analyzing unit finds out a face region of the human body according to a face recognition database and calculates the center coordinate and the face width of the face region.

To sum up, in the embodiments of the present invention, the information of the first speed and the second speed in connection with the navigation module and the image tracking module are collectively considered with the weighting value, such that an more accurate navigation result may be achieved when the autonomous electronic apparatus moves toward to the target.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Hereinafter, examples of the exemplary embodiments the present invention are illustrated in detail with reference to the accompanying drawings. In addition, wherever possible, the same or similar symbols represent the same or similar components or elements.

Figure 1:
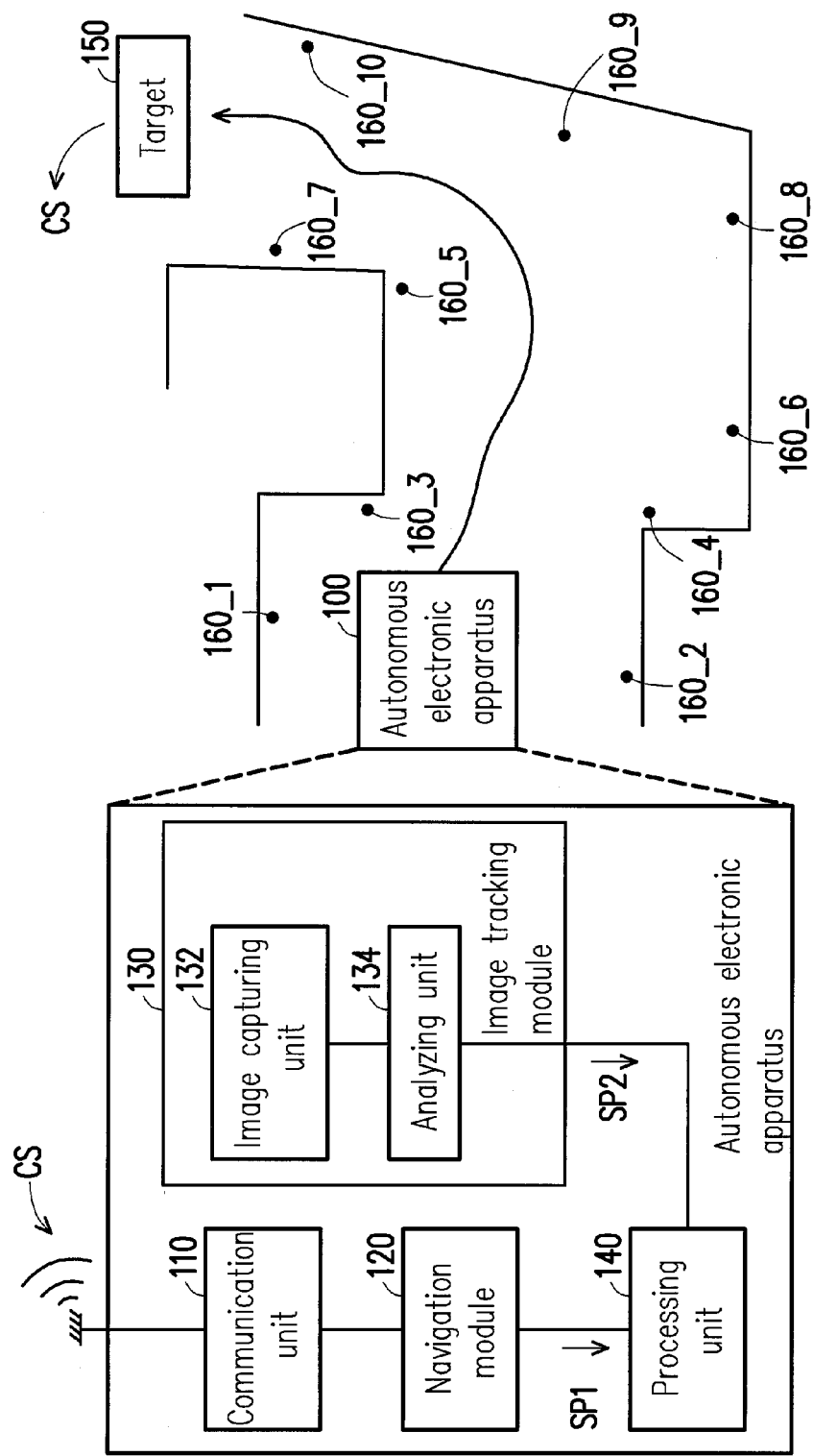
FIG. 1 is a schematic diagram illustrating an autonomous electronic apparatus moving toward a target automatically upon receiving a calling signal from the target according to an embodiment of the present invention.

FIG. 1 is a schematic diagram illustrating an autonomous electronic apparatus moving toward a target automatically upon receiving a calling signal from the target according to an embodiment of the present invention. In the present embodiment, an autonomous electronic apparatus 100 includes a communication unit 110, a navigation module 120, an image tracking module 130 and a processing unit 140. The autonomous electronic apparatus 100 may automatically move toward where a target 150 is located upon receiving a calling signal CS sent from the target 150.

The communication unit 110 is, for example, a device supporting a wireless sensor network and receives signals from sensor nodes 160_1~160_10 and the calling signal CS sent from the target 150 through the wireless sensor network (e.g. a ZigBbee-based network). In an embodiment, when positions of the sensor nodes 160_1~160_10 are known, the target 150 may correspondingly estimate a position of itself according to the signals collected from the sensor nodes 160_1~160_10. At this time, the target 150 may also send its own position to the wireless sensor network, such that the autonomous electronic apparatus 100 may then receive a target position related to the target 150 through the communication unit 110.

The navigation module 120 is coupled to the communication unit 110. After the target position sent by the communication unit 110 is received, the navigation module 120 calculates a movement parameter of enabling the autonomous electronic apparatus 100 to move toward the target 150. In detail, the navigation module 120 may correspondingly estimate its own position according to the signals collected by the communication unit 110 from the sensor nodes 160_1~160_10 so as to adjust a moving path of the autonomous electronic apparatus 100, for example. Additionally, in the embodiment, the navigation module 120 may further include a scanning unit (e.g., a laser scanner), which can be adopted to scan obstacles in the surroundings, such that the autonomous electronic apparatus 100 may avoid the obstacles while traveling forward.

The image tracking module 130 includes an image capturing unit 132 and an analyzing unit 134. The image capturing unit 132 is, for example, a device or an element (e.g. a Kinect sensor) capable of simultaneously capturing a depth image and a color image. The analyzing unit 134 is coupled to the image capturing unit 132 and may be configured to analyze the depth image and the color image that are captured by the image capturing unit 132 so as to obtain required information. For example, after the depth image is captured by the image capturing unit 132, the analyzing unit 134 may find out a body shape in the depth image according to a body recognition database in an open natural interaction (OpenNI), for example, so as to be aware that a human (or a human pattern) exists within a captured range of the image capturing unit 132. Additionally, after the color image is captured by the image capturing unit 132, the analyzing unit 134 may determine whether a human face feature, for example, appears in the color image according to a face recognition database in an open source computer vision (OpenCV).

The processing unit 140 is coupled to the navigation module 120 and the analyzing unit 134 and configured to control a moving status, such as avoiding an obstacle, turning and adjusting a traveling speed, of the autonomous electronic apparatus 100 according to information provided by the navigation module 120 and the analyzing unit 134. The processing unit 140 is, for example, a central processing unit (CPU), a microprocessor, a digital signal processor (DSP), an application specific integrated circuits (ASIC) or the like.

Figure 2:
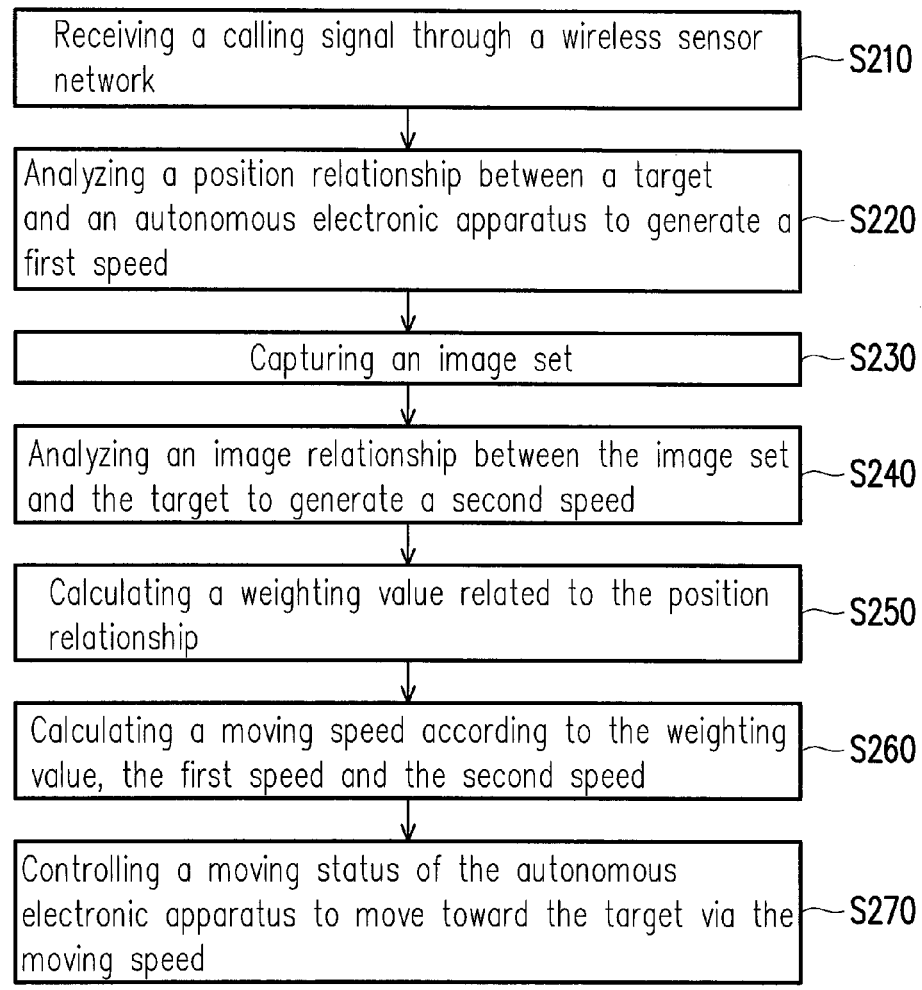
FIG. 2 is a flowchart illustrating a navigation method according to an embodiment of the present invention.

FIG. 2 is a flowchart illustrating a navigation method according to an embodiment of the present invention. Referring to both FIG. 2 and FIG. 1, each step of the navigation method used by the autonomous electronic apparatus 100 to move toward the target 150 is illustrated in detail with reference to each of the elements depicted in FIG. 1 hereinafter. In the present embodiment, the target 150 is, for example, a human body while the autonomous electronic apparatus 100 is a robot having motor controller (not shown), a motor driver (not shown) and a wheel (not shown), which are coupled to one another.

In step S210, the target 150 may send a calling signal CS to the wireless sensor network through a device, such as a wireless signal transmitter, such that the communication unit 110 may receive the calling signal CS through the wireless sensor network. In step S220, the navigation module 120 may analyze the position relationship between the target 150 and the autonomous electronic apparatus 100 to generate a first speed SP1 of enabling the autonomous electronic apparatus 100 to move toward the target 150. To be specific, after the communication unit 110 collects information (e.g. signal strengths and information of positions) associated with the sensing points 160_1~160_10, the navigation module 120 may estimate an estimated position where the autonomous electronic apparatus 100 is currently located accordingly. Then, the navigation module 120 may further determine the first speed SP1 enabling the autonomous electronic apparatus 100 to move toward the target 150 after the target position sent by the target 150 through, for example, the wireless signal transmitter is received by the communication unit 120.

For instance, if, at a certain time point, signal strengths of the sensor nodes 160_1 and 160_2 transmitted to the communication unit 110 are stronger while signal strengths of the sensor nodes 160_3~160_10 are sequentially decreasing, the navigation module 120 may determine that distances to the sensor nodes 160_1 and 160_2 are shorter. Upon the acknowledgment that the target position is approaching the position of the sensor nodes 160_10, the navigation module 120 may calculate a direction for the autonomous electronic apparatus 100 to move toward to arrive where the target 150 is located.

It should be noted that after determining the first speed SP1, the autonomous electronic apparatus 100 does not directly move toward the target 150 based on the first speed SP1. Instead, until an image tracking result is generated by the image tracking module 130, parameters for controlling a moving status of the autonomous electronic apparatus 100 may be generated by the processing unit 140 based on the consideration of information provided by the navigation module 120 and the image tracking module 130, such that the autonomous electronic apparatus 100 performs its actual movement.

In other embodiments, the navigation module 120 may further consider the information of the obstacles surrounding the autonomous electronic apparatus 100 provided by the scanning unit (e.g., the laser scanner), and correspondingly adjust the first speed SP1 to make the autonomous electronic apparatus 100 be able to dodge the surrounding obstacles while moving to the target 140. The related discussion of the mechanism about the autonomous electronic apparatus 100 dodging the surrounding obstacles would be provided later.

In step S230, the image capturing unit 132 may capture an image set for scenes in front of the autonomous electronic apparatus 100 according to the current traveling direction of the autonomous electronic apparatus 100, and the image set includes a depth image and a color image. Then, in step S240, the analyzing unit 134 may analyze an image relationship between the image set and the target 150 (e.g. a human body) to generate a second speed SP2 configured to enable the autonomous electronic apparatus 100 to move toward the target 150.

For instance, when the target 150 is a human body, the analyzing unit 134 may find out whether a shape similar to the human body appears in the depth image according to the body recognition database (e.g., OpenNI). When determining that a body shape appears in the depth image, the analyzing unit 134 may further assume that a human body appears in the scenes in front of the autonomous electronic apparatus 100 according to the image relationship between the depth image and the target 150 (i.e. the human body). Additionally, the analyzing unit 134 may further estimate a distance between the human body and the autonomous electronic apparatus 100 according to a distribution of the body shape in the depth image. Then, the analyzing unit 134 may display the body shape in the depth image and perform, for example, a centroid calculation on the displayed body shape so as to determine the humanoid coordinate (i.e. a centroid location of the body shape) of the body shape displayed in the depth image.

In addition, the analyzing unit 134 may also find out whether a region similar to the human face appears in the color image according to the face recognition database (e.g., OpenCV). When determining that a face region appears in the color image, the analyzing unit 134 may further assume that a human face appears in the scenes in front of the autonomous electronic apparatus 100 according to the image relationship between the color image and the target 150 (i.e. the human body). Then, the analyzing unit 134 may obtain face information (e.g. a center coordinate of the face region and a face width thereof) by analyzing the face region.

Afterward, the analyzing unit 134 may perform an image tracking operation on the human body appearing in front of the autonomous electronic apparatus 100 according to the humanoid coordinate and the face information so as to correspondingly generate the second speed SP2 for enabling the autonomous electronic apparatus 100 to move toward the human body. Likewise, the autonomous electronic apparatus 100 does not directly move toward the human body in front of the autonomous electronic apparatus 100 based on the second speed SP2 after the second speed SP2 is generated. The reason lies in that even though the image tracking module 130 considers the target 150 (e.g. the human body) as a tracking target, any other human body (e.g. a passing-by pedestrian) that is different from the target 150 may appear on the way of the autonomous electronic apparatus 100 moving toward the target 150. Therefore, the autonomous electronic apparatus 100 directly moving toward the tracked human body may possibly lead to an incorrect navigation result.

Accordingly, in order to improve the accuracy of navigation, the processing unit 140 may determine the parameter (i.e. either first speed SP1 or the second speed SP2) for controlling the autonomous electronic apparatus 100 to move by simultaneously considering both the first speed SP1 and the second speed SP2 and according to where the autonomous electronic apparatus 100 is currently located, which will be illustrated in detail hereinafter.

In step S250, the processing unit 140 may calculate a weighting value (i.e. a real number between 0 and 1) according to the current position relationship between the autonomous electronic apparatus 100 and the target 150. The weighting value may be configured to adjust a reference portion between the first speed SP1 and the second speed SP2. For example, when the estimated position of the autonomous electronic apparatus 100 and the target position (i.e. the location of the target) are separate from each other in a quite far distance, the human body currently appearing in the scenes in front of the autonomous electronic apparatus 100 may not be the target 150. Thus, the processing unit 140 may currently control the movement of the autonomous electronic apparatus 100 mainly based on the first speed SP1 instead of the second speed SP2 generated by the image tracking module 130. As such, even though the image tracking module 130 detects a human body of a passing-by pedestrian to correspondingly generate the second speed SP2, the autonomous electronic apparatus 100 may keep moving toward the target 150 rather than toward the pedestrian.

However, since the estimated position of the autonomous electronic apparatus 100 and the target position of the target 150 are obtained by estimation, there is still uncertainty. That is to say, there may be a difference between the estimated position of the autonomous electronic apparatus 100 and its actual location. Therefore, if the autonomous electronic apparatus 100 is continuously controlled to move mainly based on the first speed SP1, the autonomous electronic apparatus 100 may not arrive where the target 150 is located and even hit the target 150. Accordingly, with the shortening of the distance between the autonomous electronic apparatus 100 and the target 150, the processing unit 140 may gradually increase the reference portion of the second speed SP2, such that the autonomous electronic apparatus 100 may accurately move toward the target 150 according to the image tracking result. Additionally, through the analysis performed on the depth image and the color image by the analyzing unit 134, the processing unit 140 control the autonomous electronic apparatus 100 to stop at a place distanced from the front of the target 150 for a predetermined distance (e.g. 50 centimeters) according to the second speed SP2 generated by the analyzing unit 134. Accordingly, the processing unit 140 may control where the autonomous electronic apparatus 100 stops in a more accurate way without hitting the target 150.

In an embodiment, the weighting value is configured to adjust a value of the reference portion of the first speed SP1. That is to say, with the shortening of the distance between the autonomous electronic apparatus 100 and the target 150, the processing unit 140 may gradually decrease the weighting value to lower down the reference portion of the first speed SP1. In other words, when the autonomous electronic apparatus 100 is distanced from the target 150 for a longer distance, the processing unit 140 controls the movement of the autonomous electronic apparatus 100 mainly based on the information (i.e. the first speed SP1) provided by the navigation module 120. However, in the process of the autonomous electronic apparatus 100 approaching the target 150, the processing unit 140 may control the movement of the autonomous electronic apparatus 100 increasingly based on the information (i.e. the second speed SP2) provided by the image tracking module 130 by decreasing the weighting value.

Then, in step S260, the processing unit 140 may calculate an actual moving speed of the autonomous electronic apparatus 100 according to the weighting value, the first speed SP1 and the second speed SP2. For instance, if the weighting value (represented by w, which is a real number between 0 and 1) is configured to adjust the value of the reference portion of the first speed SP1, and the moving speed (represented by V) for controlling the autonomous electronic apparatus 100 to move toward the target 150 may be obtained by calculating based on a mathematical formula, $V = w \cdot SP1 + (1-w) \cdot SP2$, but the present invention is not limited thereto.

Afterward, in step S270, the processing unit 140 may control a moving status of the autonomous electronic apparatus 100 moving toward the target 150 according to the moving speed. For example, the processing unit 140 may control the autonomous electronic apparatus 100 to perform an operation, such as making a turn, moving forward, avoiding an obstacle, avoiding a pedestrian and so forth, such that the autonomous electronic apparatus 100 may successfully arrive where the target 150 is located. In an embodiment, when the autonomous electronic apparatus 100 approaches the target 150, the analyzing unit 134 may perform image tracking on the human body appearing in front of the autonomous electronic apparatus 100 according to the humanoid coordinate and the face information. Since the target 150 (for example, the target 150 is a blind person) may not be able to predetermine the direction for the autonomous electronic apparatus 100 to come over, the autonomous electronic apparatus 100 may send a notification signal (e.g. a sound) to inform the target 150 that the autonomous electronic apparatus 100 is approaching the target 150 when arriving and stopping in the front of the target 150.

It should be noted that even though the first speed SP1 is generated first (in step S220) and then second speed SP2 is generated (in steps S230~240) as shown in the flowchart of FIG. 2, in the navigation method of the present invention, steps S230~240 may also be performed first and then step S220, or each of the aforementioned steps is simultaneously performed so as to generate both the first speed SP1 and the second speed SP2.

In addition, when the autonomous electronic apparatus 100 is far apart from the target, even though the image tracking module 130 detects that a human body appears in the surroundings of the autonomous electronic apparatus 100, such detected human body may not possibly be the target 150. Accordingly, the current information provided by the image tracking module 130 is less informative, and the processing unit 140 may possibly disable the image tracking module 130 in advance. In other words, the autonomous electronic apparatus 100 adjust the weighting value of the first speed SP1 to be 1, such that the autonomous electronic apparatus 100 keeps being controlled to move toward the target 150 entirely based on the information provided by the navigation module 120. Until the processing unit 140 is apart from the target at a specific distance (e.g. 4 meters), the image tracking module 130 is enabled so that the image tracking result thereof is taken into consideration.

On the other hand, when the autonomous electronic apparatus 100 is quite near (e.g. 1.5 meters), since the processing unit 140 should control the autonomous electronic apparatus 100 mainly based on the image tracking result, the processing unit 140 may disable the navigation module 120 so as to avoid the moving status of the autonomous electronic apparatus 100 being influenced by the information of the navigation module 120.

People with ordinary skills in the art should know that in the aforementioned embodiment, the weighting value is configured to adjust the reference portion of the first speed SP1 when calculating the moving speed; however, in other embodiments, the weighting value may also be configured to adjust a value of a reference portion of the second speed SP2. Under such situation, methods of adjusting the weighting value and calculating the moving speed as the distance is changed should also be modified. For instance, with the shortening of the distance between the autonomous electronic apparatus 100 and the target 150, the processing unit 140 may gradually increase the weighting value so as to increase the reference portion of the second speed SP2. Additionally, the method of calculating the moving speed may be modified as being obtained based on a mathematical formula, $V=(1-w)\cdot SP1+w\cdot SP2$, but the present invention is not limited thereto.

People with ordinary skills in the art should also know that the autonomous electronic apparatus 100, the target 150, the environment and the configuration of the sensing points 160_1~160_10 are merely illustrated in FIG. 1 as an example, which are not construed as any limitation to the present invention.

Figure 3:
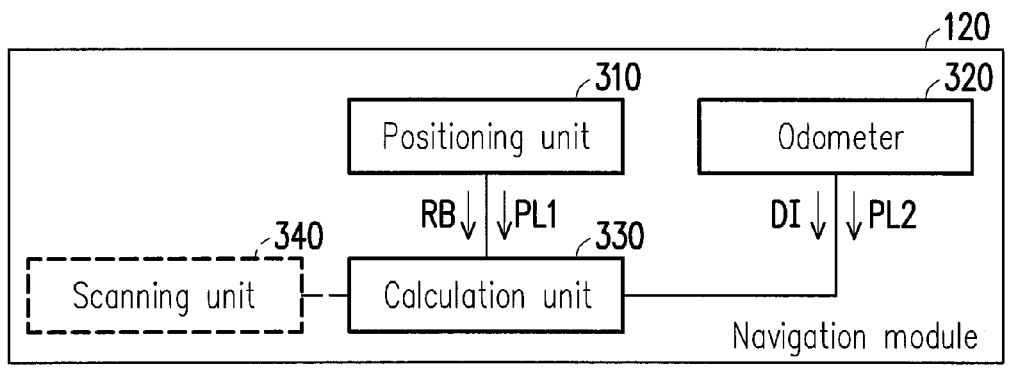
FIG. 3 is a schematic diagram illustrating a navigation module according to the embodiment as depicted FIG. 1.

FIG. 3 is a schematic diagram illustrating a navigation module according to the embodiment as depicted FIG. 1. In the present embodiment, the navigation module 120 includes a positioning unit 310, an odometer 320 and a calculation unit 330. The positioning unit 310 is coupled to the calculation unit 330 and may receive the information (e.g. the signal strength and the position information of each of the sensor nodes 160_1~160_10) associated with the wireless sensor network transmitted by the communication unit 110, as shown in FIG. 1. The odometer 330 is coupled to the calculation unit 330 and is coupled to a device, such as a motor controller (not shown), a motor driver (not shown) and a wheel (not shown) so as to calculate the accumulated movement distance of the autonomous electronic apparatus 100 according to data provided by the devices. Then, after considering information provided by the positioning unit 310 and the odometer 320, the calculation unit 330 may calculate the estimated position of the autonomous electronic apparatus 100 so as to generate the first speed SP1. In other words, the calculation unit 330 would not only determine the estimated position of the autonomous electronic apparatus 100 according to the information provided by the positioning unit 310 or the odometer 320, but would simultaneously consider the information provided by the positioning unit 310 and the odometer 320, and then decide which information should be mainly considered to determine the estimated position of the autonomous electronic apparatus 100.

In the embodiment, with the estimated position, the calculation unit 330 further considers the information provided by a scanning unit 340 (e.g., the laser scanner) during the process of generating the first speed SP1, where the scanning unit 340 is included in the navigation module 120 and coupled to the calculation unit 330. To be specific, as mentioned before, the scanning unit 340 (e.g., the laser scanner) is adopted to scan the obstacles around the autonomous electronic apparatus 100. With the information of the scanned obstacles, the calculation unit 330 makes the autonomous electronic apparatus 100 be able to dodge the obstacles according to some algorithms designed for dodging obstacles. Thus, the calculation unit 330 can determine first moving parameters (e.g., directions and/or speed) of the autonomous electronic apparatus 100 to prevent from hitting the scanned obstacles. Meanwhile, with the estimated position of the autonomous electronic apparatus 100 and the target position, the calculation unit 330 could generate second moving parameters (e.g., directions and/or speed) for the autonomous electronic apparatus 100 to move toward the target 150. Therefore, after simultaneously considering the first moving parameters and the second moving parameters, the calculation unit 330 could generate the first speed SP1, which makes the autonomous electronic apparatus 100 be able to move toward the target 150 while dodging the surrounding obstacles.

Figure 4:
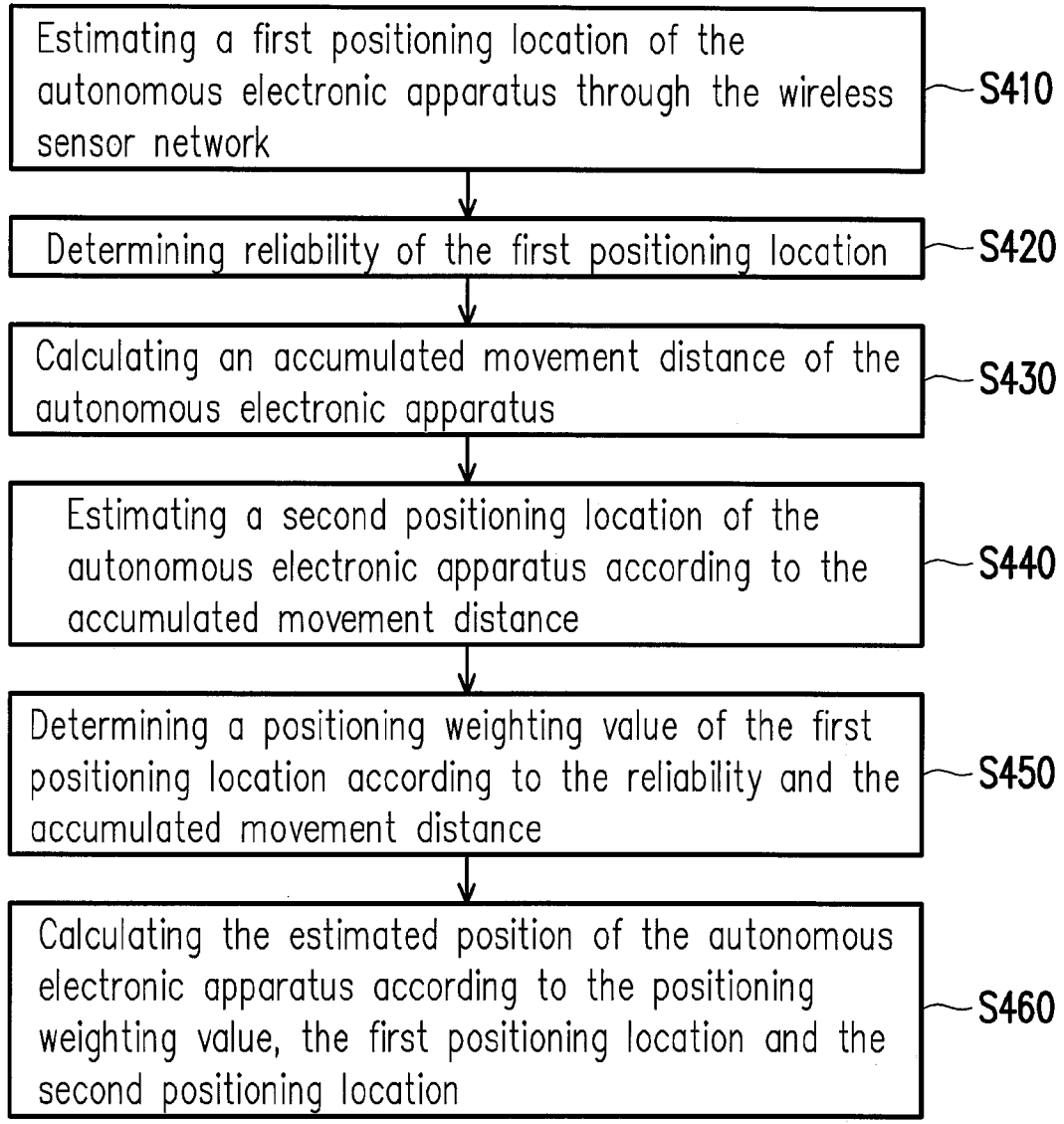
FIG. 4 is a flowchart of estimating the estimated position of the autonomous electronic apparatus according to the embodiment as depicted in FIG. 2.

FIG. 4 is a flowchart of estimating the estimated position of the autonomous electronic apparatus according to the embodiment as depicted in FIG. 2. Referring to both FIG. 4 and FIG. 3, each step of the method illustrated in FIG. 4 is illustrated in detail with reference with each of the elements depicted in FIG. 3 hereinafter. In step S410, the positioning unit 310 may estimate a first positioning location PL1 of the autonomous electronic apparatus 100 according to the information (e.g. the signal strength and the corresponding relationship of the position information of each of the sensor nodes 160_1~160_10) associated with the wireless sensor network provided by the communication unit 110 shown in FIG. 1.

In step S420, the positioning unit 310 may determine reliability RB of the first positioning location PL1. In detail, a difference between the first positioning location PL1 and the actual location of the autonomous electronic apparatus 100 may occur due to various types of unstable factors of the wireless sensor network, and thus, the positioning unit 310 may determine the reliability RB of the first positioning location PL1 through a specific manner.

For example, the positioning unit 310 may record the first positioning location PL1 every time when the first positioning location PL1 is obtained and performs a difference calculation on the first positioning location PL1 obtained in the current time point and the first positioning location obtained in a previous time point (e.g. 0.5 seconds ago) so as to obtain a difference value between the two positioning locations. When the difference value is 100 cm, it represents that the autonomous electronic apparatus 100 moves for 100 cm within 0.5 seconds, such that the positioning unit 310 may determine that the reliability RB of the first positioning location PL1 at this time is lower (because an unreasonable moving status of the autonomous electronic apparatus 100 is generated within 0.5 seconds). In another example, if the difference value is 10 cm, the positioning unit 310 may determine that the reliability RB of the first positioning location PL1 at this time is higher (because the moving status of the autonomous electronic apparatus 100 within 0.5 seconds seems more reasonable) In brief, the difference value and the reliability RB inversely proportional.

Then, in step S430, the odometer 320 may calculate an accumulated movement distance DI of the autonomous electronic apparatus 100 and estimates a second positioning location PL2 of the autonomous electronic apparatus 100 according to the accumulated movement distance DI in step S440. To be specific, the odometer 320 may estimate the second positioning location PL2 of the autonomous electronic apparatus 100 by combining the estimated position obtained according to a previous time point (e.g. 0.5 seconds ago) and the accumulated movement distance DI measured at the current time point and information, such as a rotation manner of the wheel. However, with the increase of distance that the autonomous electronic apparatus 100 has moved, the odometer 320 may calculate the incorrect second positioning location PL2 due to the accumulation of errors.

Then, the calculation unit 330 may determine whether to estimate the estimated position of the autonomous electronic apparatus 100 mainly based on the first positioning location PL1 or the second positioning location PL2 according to the information such as the reliability RB and the accumulated movement distance DI. Thus, in step S450, the calculation unit 330 may determine a positioning weighting value of the first positioning location PL1 according to the reliability RB and the accumulated movement distance DI. In detail, when the reliability RB is higher or the accumulated movement distance DI is longer, it represents that an estimated result of the positioning unit 310 is more accurate, while an estimated result of the odometer 320 is less accurate due to the accumulation of the errors. At this time, the calculation unit 330 may gradually increase the positioning weighting value of the first positioning location PL1 so as to estimate the estimated position of the autonomous electronic apparatus 100 mainly based on the first positioning location PL1. On the other hand, when the reliability RB is lower or the accumulated movement distance DI is shorter, it represents that the estimated of the positioning unit 310 is less accurate, while the estimated result of the odometer 320 is more accurate since not too many errors are accumulated. At this time, the calculation unit 330 may decrease the positioning weighting value of the first positioning location PL1, and namely, the first positioning location PL1 is not adopted to estimate the estimated position of the autonomous electronic apparatus 100.

Afterward, in step S460, the calculation unit 330 may calculate the estimated position of the autonomous electronic apparatus 100 according to the positioning weighting value, the first positioning location PL1 and the second positioning location PL2. For instance, the estimated position (represented by EL) of the autonomous electronic apparatus 100 is obtained by calculating a mathematical formula, $EL=pw \cdot PL1+(1-pw) \cdot PL2$, for example. Therein, pw is the positioning weighting value of the first positioning location PL1, which is a real number between 0 and 1.

Accordingly, after considering the information provided by the positioning unit 310 and the odometer 320, the calculation unit 330 may obtain a more accurate estimated position, instead of generating an incorrect estimated position due to unstable first positioning location PL1 or the second positioning location PL2 with too many accumulated errors. In addition, in other embodiments, since the odometer 320 typically requires lower computational complexity and has better positioning accuracy when autonomous electronic apparatus 100 is initially moved, the calculation unit 330 may determine the estimated position by merely referring to the second positioning location PL2.

It should be noted that even though in the flowchart of FIG. 4, the reliability is determined first according to the first positioning location PL1 (in steps S410~S420) and then, the second positioning location PL2 is estimated according to the accumulated movement distance DI (in steps S430~S440). However, steps S430~S440 of the method of calculating the estimated position of the autonomous electronic apparatus 100 may be first performed and steps S410~S420 or the aforementioned steps are simultaneously performed.

Based on the above, in the autonomous electronic apparatus and the navigation method thereof according to the embodiments of the present invention, after the first speed and the second speed are obtained through the navigation module and the image tracking module respectively, the first speed and the second speed are taken into consideration by the processing unit using the weighting value concept so as to obtain the optimal moving speed for the autonomous electronic apparatus. Thus, in addition to moving toward the target from a distance in response to the calling signal, autonomous electronic apparatus may further move toward the target more accurately when approaching the target. Further, since the moving status of the autonomous electronic apparatus is controlled mainly according to the second speed of the image tracking module when approaching the target, the distance between the autonomous electronic apparatus and the target may be controlled more accurately so as to avoid hitting the target.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A navigation method, adapted for an autonomous electronic apparatus, comprising:
    receiving a calling signal through a wireless sensor network, wherein the calling signal is from a target;
    analyzing a position relationship between the target and the autonomous electronic apparatus to generate a first speed;
    capturing an image set;
    analyzing an image relationship between the image set and the target to generate a second speed;
    calculating a weighting value related to the position relationship;
    calculating a moving speed according to the weighting value, the first speed and the second speed; and
    controlling a moving status of the autonomous electronic apparatus to move toward the target via the moving speed.

2. The method according to claim 1, wherein the step of analyzing the position relationship between the target and the autonomous electronic apparatus to generate the first speed comprises:
   estimating an estimated position of the autonomous electronic apparatus;
   receiving a target position of the target through the wireless sensor network; and
   determining the first speed of enabling the autonomous electronic apparatus to move toward the target according to the estimated position and the target position.

3. The method according to claim 2, wherein the step of estimating the estimated position of the autonomous electronic apparatus comprises:
   estimating a first positioning location of the autonomous electronic apparatus;
   determining reliability of the first positioning location;
   calculating an accumulated movement distance of the autonomous electronic apparatus;
   estimating a second positioning location of the autonomous electronic apparatus according to the accumulated movement distance; and
   determining a positioning weighting value of the first positioning location according to the reliability and the accumulated movement distance;
   calculating the estimated position of the autonomous electronic apparatus according to the positioning weighting value, the first positioning location and the second positioning location.

4. The method according to claim 3, wherein the step of estimating the first positioning location of the autonomous electronic apparatus comprises:
   receiving position information associated with a plurality of sensor nodes in the wireless sensor network;
   detecting a signal strength of each of the sensor nodes; and
   determining the first positioning location according to a corresponding relationship between the position information and the signal strength of each of the sensor nodes.

5. The method according to claim 3, wherein the step of determining the reliability of the first positioning location comprises:
   recording the first positioning location; and
   calculating a difference value between the first positioning location in a current time interval and the first positioning location in a previous time interval,
   wherein the difference value and the reliability is inversely proportional.

6. The method according to claim 3, wherein the step of analyzing the position relationship between the target and the autonomous electronic apparatus to generate the first speed further comprising scanning obstacles around the autonomous electronic apparatus, such that the autonomous electronic apparatus can dodge the obstacles while moving to the target by adjusting the first speed.

7. The method according to claim 1, wherein the image set comprises a depth image and a color image, the target is a human body, and the step of analyzing the image relationship between the image set and the target to generate the second speed comprises:
   detecting a humanoid coordinate of the human body in the depth image;
   detecting face information of the human body in the color image; and
   determining the second speed of enabling the autonomous electronic apparatus to move toward the human body by combining of the humanoid coordinate and the face information.

8. The method according to claim 7, wherein the step of detecting the humanoid coordinate of the human body in the depth image comprises:
   finding out a body shape of the human body according to a body recognition database;
   displaying the body shape in the depth image; and
   performing a centroid calculation on the displayed body shape to determine the humanoid coordinate.

9. The method according to claim 7, wherein the face information comprises a center coordinate and a face width, and the step of detecting the face information of the human body in the color image comprises:
   finding out a face region of the human body according to a face recognition database; and
   calculating the center coordinate and the face width of the face region.

10. An autonomous electronic apparatus, comprising:
    a communication unit, receiving a calling signal through a wireless sensor network, wherein the calling signal is from a target;
    a navigation module, coupled to the communication unit and analyzing a position relationship between the target and the autonomous electronic apparatus to generate a first speed;
    an image tracking module, comprising:
       an image capturing unit, capturing an image set; and
       an analyzing unit, coupled to the image capturing unit and analyzing an image relationship between the image set and the target to generate a second speed; and
    a processing unit, coupled to the navigation module and the analyzing unit, calculating a weighting value related to the position relationship, calculating a moving speed according to the weighting value, the first speed and the second speed and controlling a moving status of the autonomous electronic apparatus to move toward the target via the moving speed.

11. The autonomous electronic apparatus according to claim 10, wherein the navigation module estimates an estimated position of the autonomous electronic apparatus, receives a target position of the target through the wireless sensor network and determines the first speed of enabling the autonomous electronic apparatus to move toward the target according to the estimated position and the target position.

12. The autonomous electronic apparatus according to claim 11, wherein the navigation module comprises:
    a positioning unit, estimating a first positioning location of the autonomous electronic apparatus and determining reliability of the first positioning location;
    an odometer, calculating an accumulated movement distance of the autonomous electronic apparatus and estimating a second positioning location of the autonomous electronic apparatus according to the accumulated movement distance; and
    a calculation unit, coupled to the positioning unit and the odometer, determining a positioning weighting value of the first positioning location according to the reliability and the accumulated movement distance, and calculating the estimated position of the autonomous electronic apparatus according to the positioning weighting value, the first positioning location and the second positioning location.

13. The autonomous electronic apparatus according to claim 12,
   wherein the communication unit receives position information associated with a plurality of sensor nodes in the wireless sensor network and detects a signal strength of each of the sensor nodes, and
   wherein the positioning unit determines the first positioning location according to a corresponding relationship between the position information and the signal strength of each of the sensor nodes.

14. The autonomous electronic apparatus according to claim 12, wherein the analyzing unit records the first positioning location and calculates a difference value between the first positioning location in a current time interval and the first positioning location in a previous time interval, wherein the difference value and the reliability is inversely proportional.

15. The autonomous electronic apparatus according to claim 12, wherein the navigation module further comprises a scanning unit, coupled to the calculation unit, scanning obstacles around the autonomous electronic apparatus, such that the calculation unit can make the autonomous electronic apparatus dodge the obstacles while moving to the target by adjusting the first speed.

16. The autonomous electronic apparatus according to claim 10, wherein the image set comprises a depth image and a color image, the target is a human body, and
   wherein the analyzing unit detects a humanoid coordinate of the human body in the depth image, detects face information of the human body in the color image and determines the second speed of enabling the autonomous electronic apparatus to move toward the human body by combining the humanoid coordinate and the face information.

17. The autonomous electronic apparatus according to claim 16, wherein the analyzing unit finds out a body shape of the human body according to a body recognition database, displays the body shape in the depth image and performs a centroid calculation on the displayed body shape to determine the humanoid coordinate.

18. The autonomous electronic apparatus according to claim 10, wherein the face information comprises a center coordinate and a face width, and
   wherein the analyzing unit finds out a face region of the human body according to a face recognition database and calculates the center coordinate and the face width of the face region.

* * * * *